US011203264B2

(12) United States Patent
Nagel

(10) Patent No.: US 11,203,264 B2
(45) Date of Patent: Dec. 21, 2021

(54) CHARGING SOCKET FOR AN ELECTRICALLY DRIVEN VEHICLE

(71) Applicant: Dr. Ing. h.c. F. Porsche Aktiengesellschaft, Stuttgart (DE)

(72) Inventor: Thomas Nagel, Waldbronn-Busenbach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 808 days.

(21) Appl. No.: 15/986,168

(22) Filed: May 22, 2018

(65) Prior Publication Data

US 2018/0345804 A1 Dec. 6, 2018

(30) Foreign Application Priority Data

Jun. 6, 2017 (DE) .......................... 102017112390.3

(51) Int. Cl.
*B60L 53/16* (2019.01)
*H01R 13/66* (2006.01)
(Continued)

(52) U.S. Cl.
CPC ................ *B60L 53/16* (2019.02); *B60L 1/02* (2013.01); *B60L 53/302* (2019.02);
(Continued)

(58) Field of Classification Search
CPC ........ B60L 11/1818; B60L 1/02; B60L 53/16; B60L 53/302; B60L 53/30; H01R 13/533; H01R 13/6616; H01R 13/6683; H01R 2107/00; H01R 2201/26; H01R 24/20; H01R 24/76; H05B 2203/014; H05B 3/18; Y02T 10/70; Y02T 10/7072; Y02T 90/12; Y02T 90/14
(Continued)

(56) References Cited

U.S. PATENT DOCUMENTS 9,511,673 B2 12/2016 Rill et al.
10,081,262 B2 9/2018 Nagel et al.
(Continued)

FOREIGN PATENT DOCUMENTS

CN 204304097 U 4/2015
CN 106409420 A 2/2017
(Continued)

OTHER PUBLICATIONS

German Search Report for German Application No. 10 2017 112 390.3, dated Feb. 28, 2018, with partial English translation, 10 pages.
(Continued)

*Primary Examiner* — Dana Ross
*Assistant Examiner* — James F Sims, III
(74) *Attorney, Agent, or Firm* — RatnerPrestia

(57) ABSTRACT

Charging socket for an electrically driven vehicle, having a main body with at least one contact section having electrical contacts for receiving in an interlocking manner a mating contact section of a charging plug having electrical mating contacts for forming an electrical charging connection between the electrical contacts and the electrical mating contacts, wherein the main body has at least one heating element for heating the at least one contact section.

13 Claims, 4 Drawing Sheets

(51) Int. Cl.
*H01R 13/533* (2006.01)
*H05B 3/18* (2006.01)
*B60L 1/02* (2006.01)
*B60L 53/302* (2019.01)
*H01R 107/00* (2006.01)
*H01R 24/20* (2011.01)
*H01R 24/76* (2011.01)

(52) U.S. Cl.
CPC ....... *H01R 13/533* (2013.01); *H01R 13/6616* (2013.01); *H01R 13/6683* (2013.01); *H05B 3/18* (2013.01); *H01R 24/20* (2013.01); *H01R 24/76* (2013.01); *H01R 2107/00* (2013.01); *H01R 2201/26* (2013.01); *H05B 2203/014* (2013.01)

(58) Field of Classification Search
USPC .......................... 219/202; 320/109, 150–154
See application file for complete search history.

(56) References Cited

U.S. PATENT DOCUMENTS

| | | | |
|---|---|---|---|
| 2011/0199047 A1* | 8/2011 | Fujii | B60L 53/16 |
| | | | 320/109 |
| 2016/0288658 A1 | 10/2016 | Rudolph et al. | |
| 2017/0028882 A1 | 2/2017 | Nagel et al. | |

FOREIGN PATENT DOCUMENTS

| | | |
|---|---|---|
| DE | 102012208005 A1 | 11/2013 |
| DE | 102015206047 A1 | 10/2016 |
| DE | 102015112347 A1 | 2/2017 |
| DE | 102016012181 B3 | 6/2017 |

OTHER PUBLICATIONS

Chinese Office Action for Chinese Application No. 201810561519.5, dated Jul. 3, 2019, with translation, 9 pages.

* cited by examiner

CHARGING SOCKET FOR AN ELECTRICALLY DRIVEN VEHICLE

CROSS-REFERENCE TO RELATED APPLICATION

This application claims priority to German Patent Application No. DE 10 2017 112 390.3, filed Jun. 6, 2017, which is incorporated by reference herein in its entirety.

FIELD OF THE INVENTION

The present invention relates to a charging socket for an electrically driven vehicle, and also to a method for heating at least one contact section of a charging socket of this kind.

BACKGROUND OF THE INVENTION

It is known that electrically driven vehicles have battery apparatuses which serve as stores for electrical power in order to be able to drive the vehicle using an electric motor. These batteries are provided with a charging socket, which is designed for electrical contact to be made by a charging plug, both in the case of combined drive options, that is to say in the case of hybrid drives or range extenders, but also in the case of purely electrically driven vehicles. This electrical filling is usually carried out such that the charging socket is opened and then an associated suitable charging plug is plugged into a corresponding contact section of the charging socket. The charging process, in which an electric current flow can charge the battery apparatus in the vehicle via the charging socket, then begins.

One disadvantage of the known solutions is that the charging sockets are provided substantially exclusively passively. A passive charging socket usually also suffices to be able to ensure the charging process under normal use conditions. However, extreme weather conditions are encountered particularly in cold conditions, preferably in conditions below freezing. In the case of the known charging socket, this can lead to difficult charging conditions being encountered, in particular at the beginning of the charging cycle. It is also possible for the ingress of moisture, icing up or partial icing up to adversely affect the charging process or even mechanically prevent insertion of the charging plug into the charging socket or at least make this difficult.

SUMMARY OF THE INVENTION

The object of the present invention is to at least partially remedy the above-described disadvantages. The object of the present invention is, in particular, to be able to reliably ensure use in a cost-effective and simple manner even at relatively low temperatures for a charging socket.

The above object is achieved by a charging socket having a main body with at least one contact section having electrical contacts for receiving in an interlocking manner a mating contact section of a charging plug having electrical mating contacts for forming an electrical charging connection between the electrical contacts and the electrical mating contacts, wherein the main body has at least one heating element for heating the at least one contact section and a method for heating at least one contact section of a charging socket of an electrically driven vehicle. Further features and details of the invention can be gathered from the dependent claims, the description and the drawings. Here, it goes without saying that features and details which are described in conjunction with the charging socket according to the invention also apply in conjunction with the method according to the invention and vice versa in each case, with the result that reference is always made or can always be made to the individual aspects, of the invention reciprocally with regard to the disclosure.

A charging socket according to the invention is used for charging an electrically driven vehicle. For this purpose, the charging socket has a main body with at least one contact section having electrical contacts, which contact section is designed for receiving in an interlocking manner a mating contact section of a charging plug having electrical mating contacts for forming an electrical charging connection between the electrical contacts and the electrical mating contacts. According to the invention, the charging socket is distinguished in that the main body has one heating element for heating the at least one contact section.

A charging socket according to the invention therefore builds on the known solutions of passive charging sockets and further develops said solutions by adding functionality. This additional functionality allows the charging socket or at least a portion of the charging socket to be heated. Here, within the meaning of the present invention, a heating element is intended to be understood to mean a component which is able to introduce heat into the main body of the charging socket and, in particular, into the region of the contact section. In the process, heat can be introduced both by thermal conduction, thermal radiation and/or by heat transfer. In this case, electrical heating elements within the meaning of the present invention are particularly preferred on account of the simplicity, the light weight and the reduced complexity of the entire system. In is this case, an electrical heating element is, in particular, in the form of a resistance heating element, that is to say preferably in the form of a heating wire, which heats up under the application of current owing to the electrical resistance and in this way can output the generated heat to the contact section and across the main body by means of thermal conduction and heat transfer.

However, it goes without saying that other possible technical implementations for the heating element are separately or additionally feasible within the scope of the present invention. Therefore, for example, heating elements containing heating fluids can also be used, so that, with the aid of a heated fluid in the form of heated water or heated gas, the fluid is conducted, via corresponding heat ducts, in the region of the main body and heating of the contact section is possible there by means of heat transfer and thermal conduction once again.

It is particularly preferred when the heating element employs media which are present in the vehicle in principle. If the heating element is an electrical heating element, the energy required for it is therefore tapped off from the on-board electrical system. If the heating element used is a cooling fluid, this cooling fluid is therefore, in particular, combined with the heat machine of the vehicle or a corresponding heat circuit for heated air.

With the aid of a heating element according to the invention on the charging socket, it is then possible to be able to ensure active temperature control, in particular in low temperature, regions, for the charging socket. Therefore, if, for example, it is established that the vehicle is in an extreme weather situation below freezing, the heating element can be activated, as will be explained in more detail later with reference to the method according to the invention. With the aid of the activation, a heating process for the respective contact section or the main body of the charging socket is started. The temperature of the main body increases owing to the heating operation, so that a defined temperature situation which differs, in particular, from an extreme temperature situation at temperatures of below 0° C. can be assumed as early as at the beginning of the charging process with the charging plug inserted in the charging socket. It is also possible in this way to melt away ice or snow which has accordingly formed owing to moisture and water which has penetrated, and in this way to remove said ice or snow from the charging socket in liquid form.

By virtue of heating with the aid of the heating element even before a charging plug is inserted into the charging socket, it is possible to prevent any mechanical blockages due to snow or ice contamination by virtue of the melting and said snow or ice contamination being carried away in fluidized or liquid form, so that, after opening the charging socket, the insertion of an associated charging plug is possible in a simple and rapid manner in the usual way even under extreme weather conditions.

Within the meaning of the present invention, a contact section is intended to be understood to mean, in particular, a standardized contact section which has two or more electrical contacts. In respect of its geometric shape, the contact section corresponds to the mating contact section of a charging plug, so that an interlocking receptacle prespecifies and defines the correct electrical contact-connection here. It goes without saying that a charging socket which has two or more different contact sections can also be provided for different charging mechanisms, for example for distinguishing between charging with direct current and charging with alternating current. Identical contact sections can also be provided in a single charging socket within the meaning of the present invention, in order to be able to ensure increased transmission of power into one or more battery apparatuses of the vehicle, for example, with two more identical charging plugs in parallel. It goes without saying that, in a case of this kind, the heating element is designed to supply a corresponding heating power to at least one of the contact sections, but preferably two or more, if not even all, of the contact sections of a charging socket of this kind.

It may be advantageous when, in the case of a charging, socket according to the invention, the at least one heating element is arranged at least in sections, in particular completely, around the at least one contact section. In this case, to the distance from the respective contact section is preferably identical or substantially identical, so that the heat transportation path, which is to be covered from the point at which heat is generated in the heating element to the respective contacts on the contact section, from all points of the heating element is the same or substantially the same. The annular or circular arrangement around the respective contact section therefore provides an annular heating option, so that the desired heating power can be introduced into the contact section virtually from all sides. In addition to an improved heating power, this leads, in particular, to uniform heating of the contact section when the heating element is switched on. This uniform heating leads, in particular, to it being possible to work with smaller and less powerful and therefore cheaper and also more lightweight heating elements, together with an improved heating response. The basic concept according to the invention of providing a charging socket with a heating element can be achieved in an easier and more cost-effective manner in this way.

It is furthermore advantageous when, in a charging socket according to the invention, an electrically insulating insulation gap is formed between the at least one contact section and the at least one heating element. An insulation gap is intended to be understood to mean the distance, which is also provided as a heat transfer path, in order to transmit the heat, which is provided by the heating element, to the contact section in the main body. In this case, the insulation gap refers, in particular, to the distance between electrically conductive components of the heating element on one side of the insulation gap and electrically conductive components of the contact section, in particular the electrical contacts of the contact section, on the other side of the insulation gap. Therefore, the insulation gap serves to provide an electrical insulation effect between electrically conductive components of the heating element and the electrically conductive components of the contact section. In this case, the insulation gap preferably complies with corresponding statutory requirements for avoiding creepage currents or overvoltages which can lead to an outflow of current between the heating element and the contact section. The insulating effect in the insulation gap is provided, in particular, by a correspondingly electrically insulating material of the main body in this insulation gap.

It is likewise advantageous when, in a charging socket according to the invention, the at least one heating element is at least partially, in particular completely, embedded in the main body. Embedding has a large number of advantages. Firstly, mechanical and also optical protection for the heating element is ensured in this way. Therefore, the heating element can neither be seen nor touched even when the charging socket is open. If, in the preferred embodiment, the heating element is an electrical heating element, the electrical insulation of this electrically acting heating element is also provided by the main body with an electrically insulating material by virtue of embedding. Last but not least, improved thermal conduction is achieved in this way since, when the heating element is embedded in the material of the main body, a direct contact-connection of the surfaces is provided between the main body on the one hand and the heating element on the other. The direct contact-connection preferably prevents any air gap, so that direct heat transfer without an air gap is possible from the heating element into the main body. The thermal resistance which is established in the process is reduced, so that the desired thermal heating effect on the contact section can be d more quickly, more easily and with less heating power.

It is likewise advantageous when, in a charging socket according to the invention, the at least one heating element has at least one of the following embodiments:
  electrical heating element
  heating duct for heating fluid.

The above list is not an exhaustive list. It goes without saying that different embodiments of the heating elements can be freely combined with one another in a single charging socket. However, in the present case, an electrical heating element is preferably used. In this case, care should be taken that the appropriate media which are already present in the vehicle in the form of current or hot air are employed in the design of the heating element. The electrical heating element used is preferably a resistance heating element which, for example, can be in the form of a heating wire or heating coil.

Furthermore, it is advantageous when, in a charging socket according to the invention, the main body has at least one sensor element for detecting a sensor parameter, in particular in the form of a temperature sensor or a moisture sensor. The sensor element is therefore used for detecting a sensor parameter with a corresponding statement about the contact section or the state of the contact section, of the main body and/or of the charging socket overall. In this case, the sensor elements may be simple sensor elements which can identify, for example, the open state of a charging cover of the charging socket. It is also possible that a sensor element of this kind can identify an inserted position of a charging plug. However, sensor elements which can provide information about the need for switching on the heating element are also preferably provided. Therefore, corresponding sensor elements can be used to identify extreme weather conditions on the basis of the external temperature with the aid of a temperature sensor. The risk of ice forming can be identified by corresponding moisture sensors as sensor elements within the charging socket. It goes without saying that mechanical sensors which can directly or indirectly sense obstruction of the charging socket or mechanical blockages by ice are also feasible. Therefore, the use of sensor elements can improve or even optimize in respect of the respective intended use, in particular, the method for heating, which will be explained later, and therefore the open-loop control and closed-loop control of the heating element.

Furthermore, it may be advantageous when, in a charging socket according to the invention, at least two heating elements are arranged in the main body and can be actuated separately from one another by means of a switching apparatus. Two or more heating elements are possible, in order to be able to provide different heating powers at different positions within the main body. Therefore, it is feasible, for example, that a combined charging socket has different contact sections for different charging options. In this case, a heating element can be specifically provided for each contact section. Therefore, if charging with the first contact section is then desired, it is sufficient for this first contact section to be heated by the heating element. However, if the second contact section is used for charging, current is applied to the heating element which is specifically and correspondingly connected to said second contact section and the heating power is likewise introduced there. The described switching apparatus then allows separate driving of the individual heating elements to be provided both in respect of quantity and quality in order to be able to introduce the heating powers in the main body with a greater degree of flexibility in a manner designed for the specific individual case.

Furthermore, it is advantageous when, in a charging socket according to the invention, at least two contact sections for different mating contact sections of different charging plugs are formed in the main body. As has already been explained in the preceding paragraph, different contact sections can be provided for different charging situations. In particular, a distinction should be made between charging options for alternating current and charging options for direct current in this case. The individual contact sections can be of identical design, but usually have different numbers and shapes of the contact section or the electrical contacts. The number of contact sections is preferably correlated to the number of heating elements, so that an individual heating element which can be separately connected is also provided at least for each contact section. It goes without saying that two or more heating elements can also be used for one contact section.

The present invention likewise relates to a method for heating at least one contact section of a charging socket of an electrically driven vehicle, in particular according to the present invention, having the following steps:

activating at least one heating element, generating eat using the activated heating element for heating the at least one contact section.

By virtue of reference to a charging socket according to the invention, the same advantages as have been explained in detail with reference to a charging socket according to the invention are achieved by the method. Activation and generation of heat are preferably performed in the activated heating element by the application of electric current.

A method according to the invention can be developed to the effect that activation of the at least one heating element is performed by an activation signal, in particular by one of the following:

temperature in particular from a temperature sensor moisture signal, its particular from a moisture sensor use signal from the vehicle.

The above list is not an exhaustive list. For example, use, actions by the driver or the vehicle itself can be used as a useful signal. Therefore, unlocking, locking, starting of the engine, stopping of the engine or else starting of a charging process, which can be identified by the insertion of a charging plug into the charging socket for example, can be used. If corresponding sensor elements are provided, the sensor parameters which are generated therein can also be used as activation signals within the meaning of a method according to the invention.

BRIEF DESCRIPTION OF THE DRAWINGS

Further advantages, features and details of the invention can be gathered from the following description, in which exemplary embodiments of the invention are described in detail with reference to the drawings. Here, the features which are mentioned in the claims and the description can be essential to the invention in each case individually per se or in any desired combination. In the drawings:

DETAILED DESCRIPTION OF THE INVENTION

Figure 1:
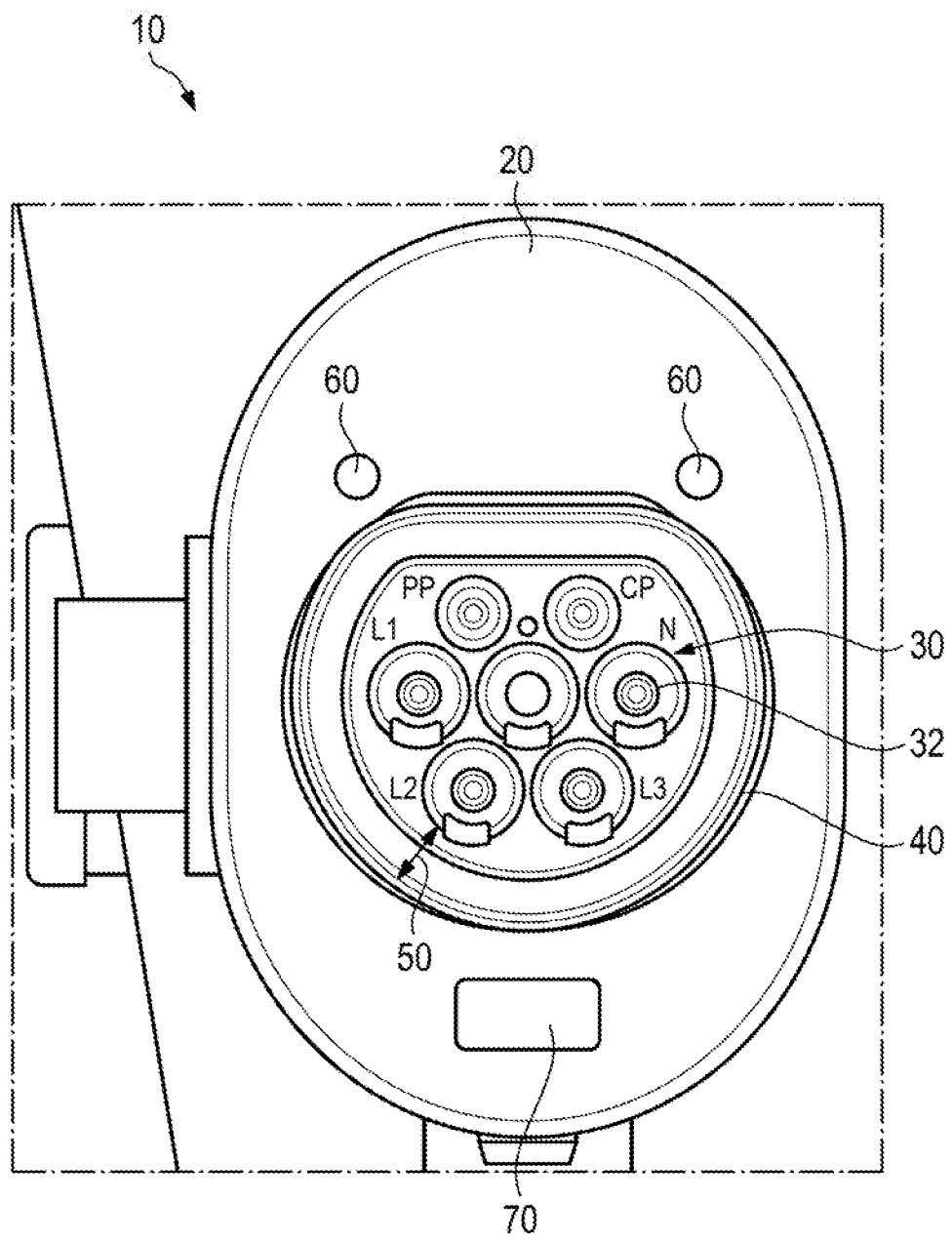
FIG. 1 schematically shows a first embodiment of a charging socket according to the invention, FIG. 2 schematically shows a further embodiment of a charging socket according to the invention, FIG. 3 schematically shows a further embodiment of a charging socket according to the invention, and FIG. 4 schematically shows a further embodiment of a charging socket according to the invention.

FIG. 1 shows a first embodiment of a charging socket 10 according to the invention having a single contact section 30. Said contact section is designed for a charging cycle with a corresponding charging plug in the alternating current mode. The individual electrical contacts 32 are arranged within a contact section 30 which has a geometric shape which is designed to complement an associated mating contact section of the charging plug which is to be used for this. The individual electrical contacts 32 can come into electrical contact with electrical mating contacts when the charging plug is inserted, so that current transfer by virtue of the electrical contact-connection and therefore charging of a battery apparatus of the connected vehicle are possible.

In order to be able to ensure the heating functionality according to the invention for the charging socket 10 according to FIG. 1, a heating element 40 which is arranged in a circular manner around the entire contact section 30 is provided here. The heating element 40 is designed for electrical heating here, so that, for example, an electrical resistance heater can be provided in the form of a heating wire. The distance between the heating element 40 and the contact section 30 is shown as an insulation gap 50 here and is ensured, in particular in respect of its electrically insulating action, by the material of the main body 20. In this case, the heating element 40 is completely or substantially completely embedded in the main body 20 of the charging socket 10.

FIG. 1 shows two further developments, specifically firstly a switching apparatus 70 which is able to switch a heating element 40, in particular with reference to a further heating element 40 which is not further illustrated, separately and specifically for the respective heating element 40. The switching apparatus 70 can likewise be used and, in the process, preferably also employ sensor signals from the sensor elements 60 for the purpose of carrying out a is method as is provided according to the invention. Here, the two sensor elements are configured as a temperature sensor and as a moisture sensor in this case.

Figure 2:
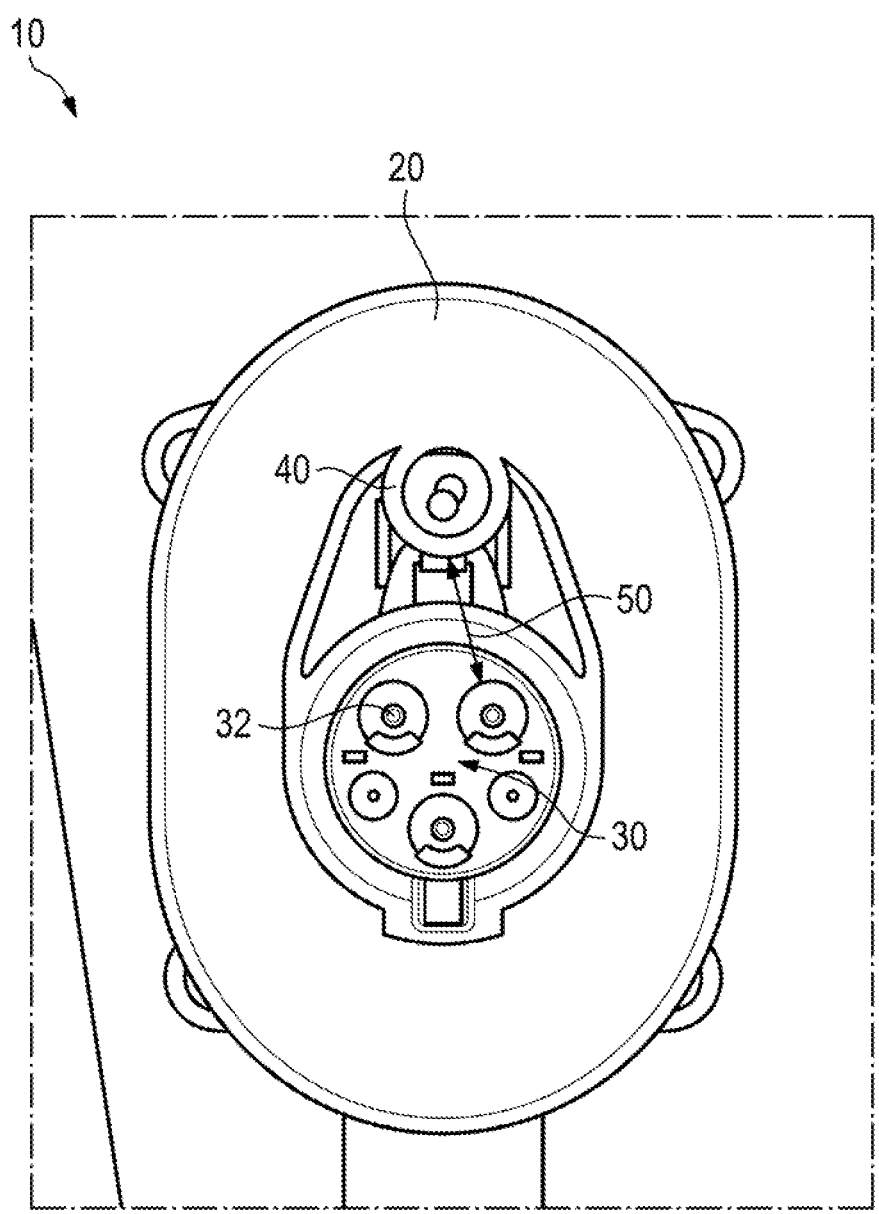

FIG. 2 shows a further embodiment of a charging socket 10 according to the invention. Said charging socket is based, in principle, on the technical considerations of the embodiment according to FIG. 1. However, here, a smaller configuration of the heating element 40 is provided, this therefore providing a larger insulation gap 50 from the contact section 30 and from the electrical contacts 32. The main body 20 likewise forms the base for this charging socket 10 again. The manner of operation is identical to the manner of operation described in relation to FIG. 1.

Figure 3:
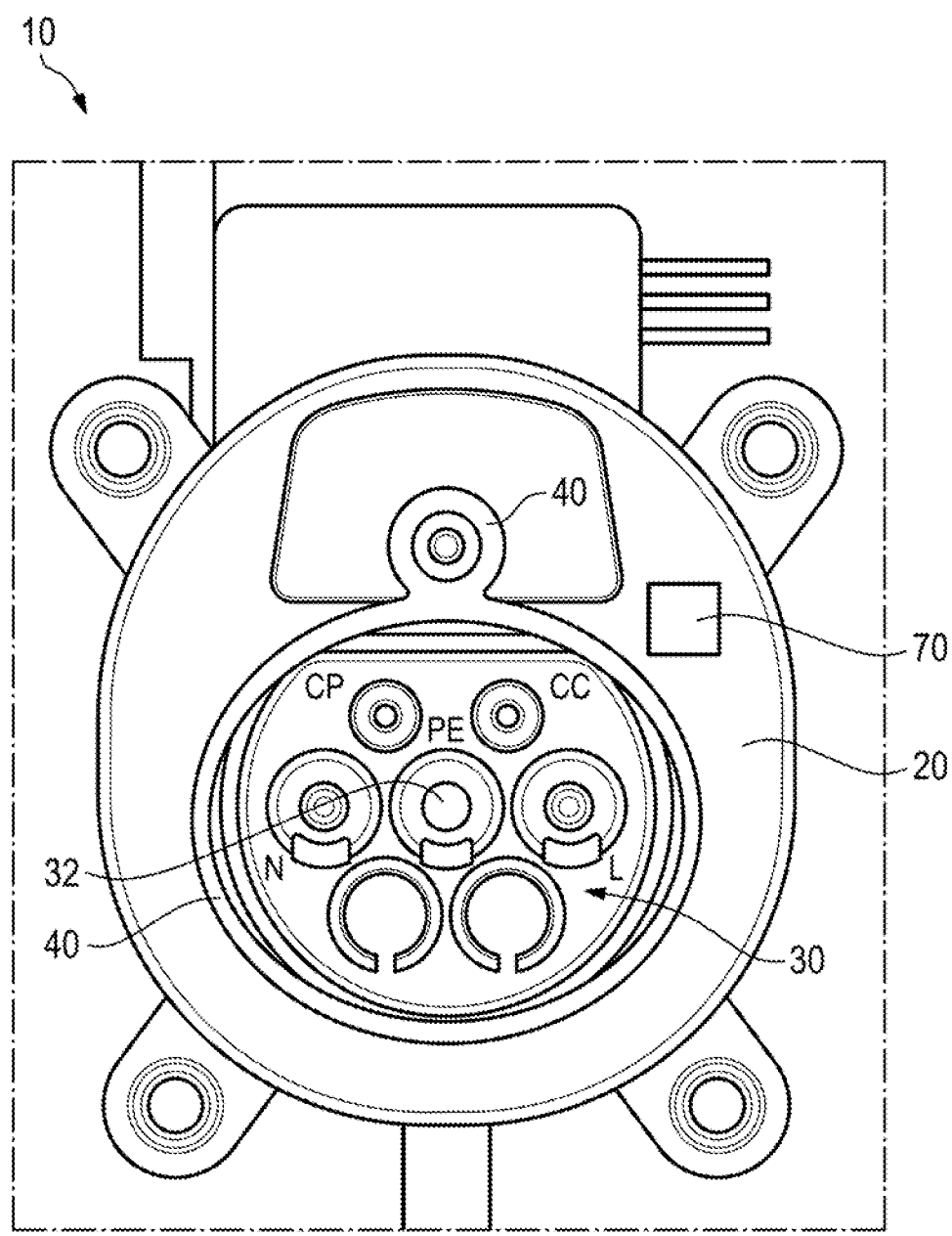

FIG. 3 shows a further embodiment of the charging socket 10 in an inventive manner. Here, two separate heating elements 40 which are provided relative to a single contact section 30 with electrical contacts 32 are then provided. The two heating elements 40 can be separately actuated and matched to specific situations with the aid of the switching apparatus 70. The two heating elements 40 are also embedded in the main body 20 of the charging socket 10 here.

Figure 4:
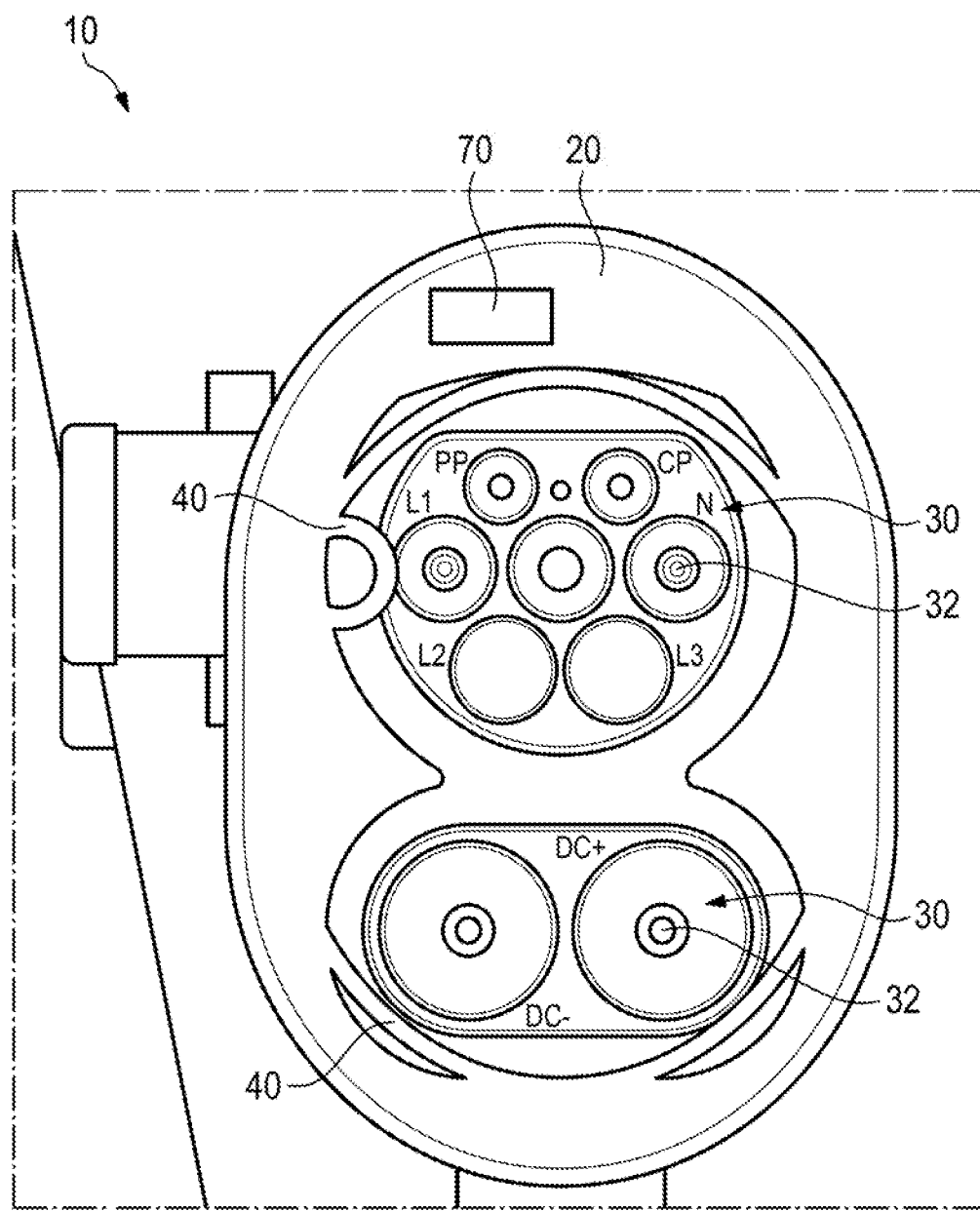

FIG. 4 then shows an embodiment with two separate contact sections 30 which both have electrical contacts 32. In this case, the lower contact section 30 is preferably provided for charging using a direct current source and a corresponding charging plug. The upper contact section 30 is preferably the same contact section as has already been shown in FIGS. 1 to 3. Here, a common and annularly enclosing heating element 40 is provided for the two contact sections 30, it likewise being possible to actuate said heating element with the aid of the switching apparatus 70 again in order to be able to provide a heating power for controlling the temperature of the two contact sections 30.

The above explanation of the embodiment describes the present invention exclusively within the context of examples. It goes without saying that individual features of the embodiments can be combined freely with one another, insofar as technically appropriate, without departing from the scope of the present invention.

What is claimed is:

1. A charging socket for an electrically driven vehicle comprising:
    a main body;
    at least one contact section within the main body having electrical contacts for receiving in an interlocking manner a mating contact section of a charging plug having electrical mating contacts for forming an electrical charging connection between the electrical contacts and the electrical mating contacts; and
    at least one heating element within the main body for heating the at least one contact section,
    wherein at least two contact sections for different mating contact sections of different charging plugs are formed in the main body,
    wherein one contact section of the at least two contact sections includes direct current electrical contacts, and the other contact section of the at least two contact sections includes alternating current electrical contacts, wherein the at least one heating element at least partially surrounds the direct current electrical contacts and a separate heating element at least partially surrounds the alternating current electrical contacts.

2. The charging socket as claimed in claim 1, wherein the at least one heating element is arranged at least in sections around the at least one contact section.

3. The charging socket as claimed in claim 2, wherein the at least one heating element completely surrounds the at least one contact section.

4. The charging socket as claimed in claim 1, further comprising:
    an electrically insulating insulation gap between the at least one contact section and the at least one heating element.

5. The charging socket as claimed in claim 1, wherein the at least one heating element is at least partially embedded in the main body.

6. The charging socket as claimed in claim 5, wherein the at least one heating element is completely embedded in the main body.

7. The charging socket as claimed in claim 1, wherein the at least one heating element has at least one of the following embodiments:
    electrical heating element; or
    heating duct for heating fluid.

8. The charging socket as claimed in claim 1, further comprising:
    at least one sensor element within the main body for detecting a sensor parameter.

9. The charging socket as claimed in claim 8, wherein the at least one sensor is at least one of a temperature sensor or a moisture sensor.

10. The charging socket as claimed in claim 1, further comprising:
    a switching apparatus wherein the at least one heating element includes at least two heating elements arranged in the main body and wherein the at least two heating elements can be actuated separately from one another by the switching apparatus.

11. The charging socket as claimed in claim 1, wherein at least two contact sections for different mating contact sections of different charging plugs are formed in the main body.

12. An electrically driven vehicle comprising the charging socket of claim 1.

13. The charging socket as claimed in claim 1, further comprising:
    at least one sensor within the main body for detecting a sensor parameter, and a switch that is configured to activate the at least one heating element as a function of the sensor parameter detected by the at least one sensor element.

* * * * *